(12) United States Patent
Yoshida

(10) Patent No.: US 6,742,049 B1
(45) Date of Patent: May 25, 2004

(54) COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 09/620,124

(22) Filed: Jul. 20, 2000

(30) Foreign Application Priority Data

Jul. 22, 1999 (JP) .......................................... 11-207359

(51) Int. Cl.⁷ .............................................. G06F 15/16
(52) U.S. Cl. ..................... 709/251; 370/432; 370/452; 370/390; 370/338; 358/403; 358/407; 358/442
(58) Field of Search ................................ 358/442, 403, 358/407, 100; 109/206, 389, 390, 251

(56) References Cited

U.S. PATENT DOCUMENTS

| | | | |
|---|---|---|---|
| 5,561,533 A | 10/1996 | Yoshida | 358/440 |
| 5,594,867 A | 1/1997 | Yoshida | 395/200.15 |
| 6,240,445 B1 * | 5/2001 | Kumar et al. | 709/206 |
| 6,256,115 B1 * | 7/2001 | Adler et al. | 358/442 |
| 6,452,691 B1 * | 9/2002 | Marshall | 358/1.15 |
| 6,477,243 B1 * | 11/2002 | Choksi et al. | 379/100.06 |

* cited by examiner

Primary Examiner—Hosain Alam
Assistant Examiner—Shabana Qureshi
(74) Attorney, Agent, or Firm—Fitzpatrick, Cella, Harper & Scinto

(57) ABSTRACT

The invention provides a communication apparatus easy for use.

A CPU registers a nickname, a sub-address signal and a transfer address corresponding to a ring type multi-address transmission number, also registers a sub-address signal and a communication specification corresponding to a memory box, further select the start of a ring type multi-address transmission, enters a password signal, discriminates at the reception of a sub-address signal in data reception whether the ring type multi-address transmission is designated by such sub-address signal, and changes the handling of the password signal according to the result of such discrimination.

6 Claims, 9 Drawing Sheets

| RING TYPE MULTI-ADDRESS TRANSMISSION NUMBER | NICKNAME | SUB-ADDRESS SIG | TRANSFER ADDRESS |
|---|---|---|---|
| 01 | PRIMARY SCHOOL CIRCULATION | 1234 | 03-3111-1234 |
| 02 | PTA CIRCULATION | 1248 | 03-3111-2222 |

FIG. 2A

| RING TYPE MULTI-ADDRESS TRANSMISSION NUMBER | NICKNAME | SUB-ADDRESS SIG | TRANSFER ADDRESS |
|---|---|---|---|
| 01 | PRIMARY SCHOOL CIRCULATION | 1234 | 03-3111-1234 |
| 02 | PTA CIRCULATION | 1248 | 03-3111-2222 |

FIG. 2B

| MEMORY BOX | SUB-ADDRESS SIG | COMM SPECIFICATION |
|---|---|---|
| 01 | 1111 | TRANSFER TO "03-3123-4567" |

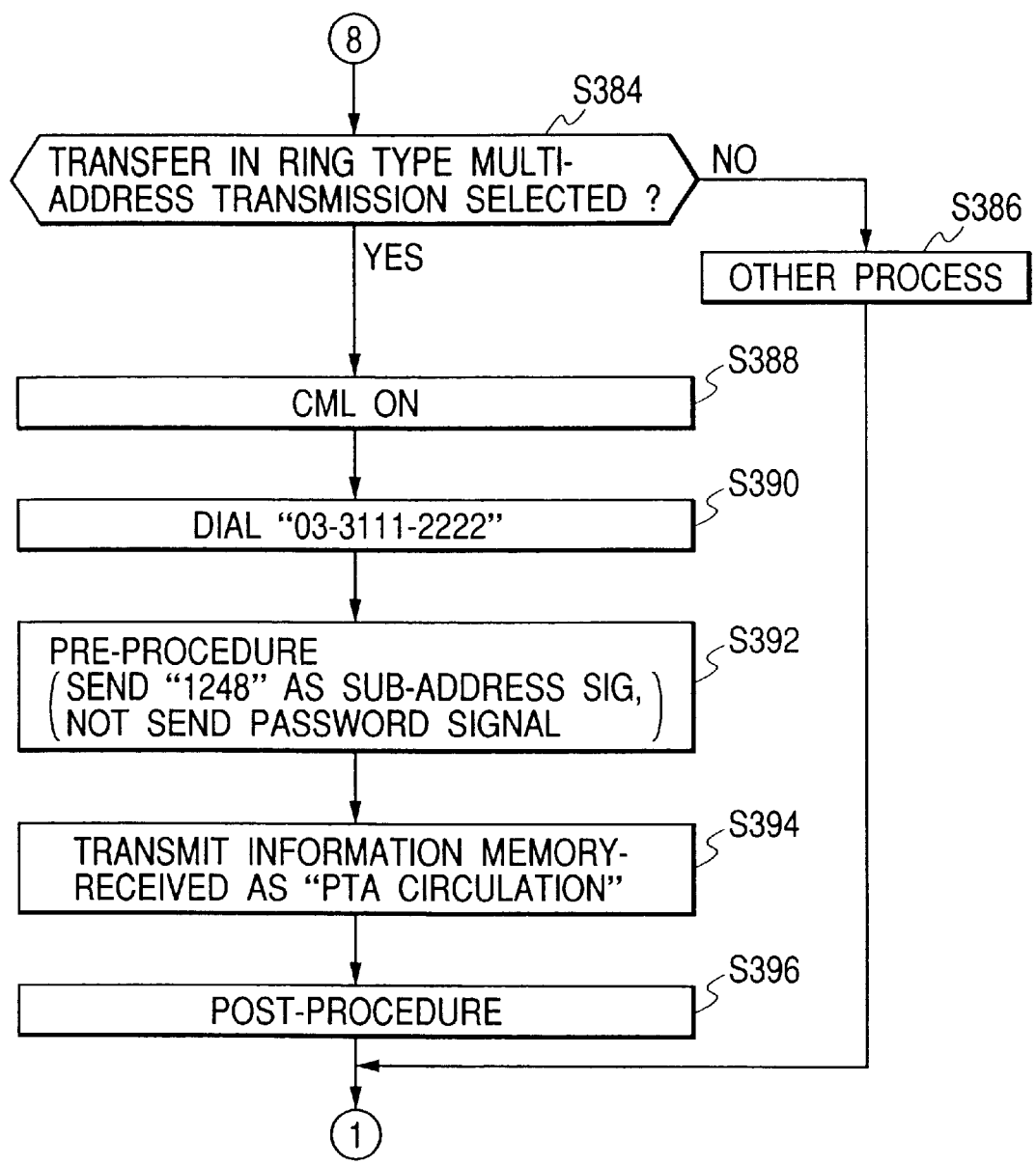

COMMUNICATION APPARATUS

BACKGROUND OF THE INVENTION

1. Field of the Invention

The present invention relates to a communication apparatus capable of ring type multi-address transmission.

2. Related Background Art

At first there will be explained a facsimile apparatus as an example of the communication apparatus.

In the conventional facsimile apparatus capable of ring type multi-address transmission, a user enters plural addresses in case of transmitting information to plural addresses, and the facsimile apparatus executes transmission of the information to the plural addresses by making calls in succession to the entered addresses.

In such conventional configuration, however, the facsimile apparatus executing such multi-address transmission has to bear the cost of all the communications, so that such configuration is not suitable for example for the facsimile communication to be circulated within a local community.

Also in the conventional multi-address transmission, it is not clear whether the transmission is actually read by a user at the destination of each transmission.

On the other hand, it is conceived to execute the multi-address transmission in the ring type, for example from a fax A to a fax B, then from the fax B to a fax C, from the fax C to a fax D, from the fax D to a fax E and from the fax E to the fax A, but such ring type multi-address transmission is associated with a drawback that the circulation of information becomes impossible if a password signal is transmitted.

SUMMARY OF THE INVENTION

In consideration of the foregoing, an object of the present invention is to provide a facsimile apparatus easy for use.

BRIEF DESCRIPTION OF THE DRAWINGS

FIGS. 2A and 2B are views showing examples of data registered in a memory circuit in the facsimile apparatus embodying the present invention; and FIGS. 3, 4, 5, 6, 7, 8, 9 and 10 are flow charts showing the flow of functions in the facsimile apparatus embodying the present invention.

DESCRIPTION OF THE PREFERRED EMBODIMENTS

In the following the present invention will be clarified in detail, taking a facsimile apparatus as an example of the communication apparatus, with reference to the accompanying drawings.

Figure 1:
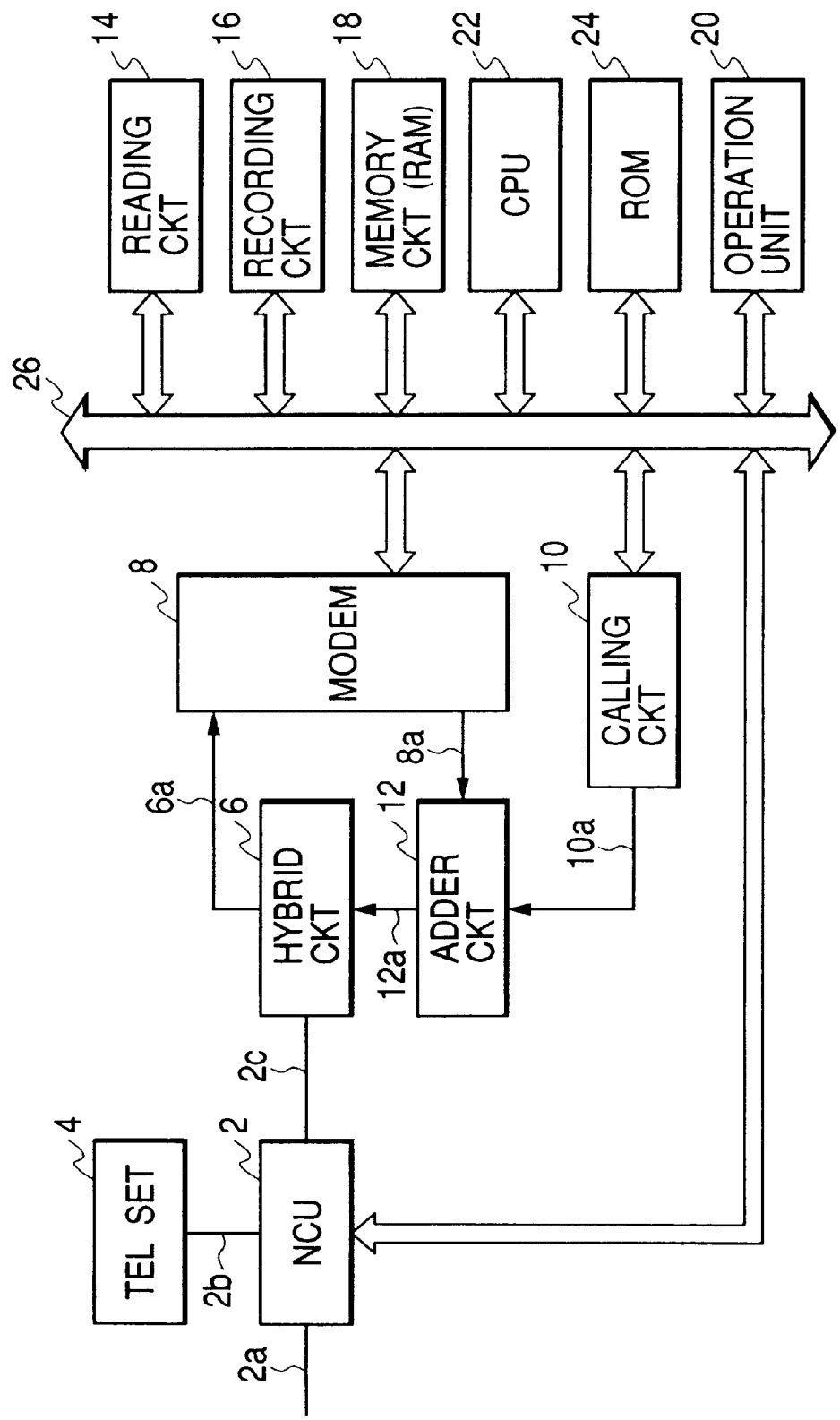
FIG. 1 is a block diagram showing the configuration of a facsimile apparatus constituting an embodiment of the present invention.

FIG. 1 is a block diagram showing the configuration of a facsimile apparatus constituting an embodiment of the present invention. Referring to FIG. 1, an NCU (network control unit) 2 executes connection to a line of a telephone network connection control in the telephone network, switching to a data communication line, loop holding, etc. in order to utilize the telephone network for data communication. Also the NCU 2 connects a telephone line 2a to a telephone set 4 (CML off) to be explained later or connects the telephone line 2a to a facsimile apparatus (CML on) according to a control signal from a bus 26 to be explained later. In the normal state, the telephone line 2a is connected to the telephone set 4.

A hybrid circuit 6 separates a transmission signal and a reception signal, sends a transmission from an addition circuit 12 to be explained later to the telephone line 2a through the NCU 2, also receives a signal from a partner apparatus through the NCU 2 and a signal line 2c and sends such signal to a modem 8 to be explained later through a signal line 6a.

The modem 8 executes modulation and demodulation according to the ITU-T recommendations V.8, V.21, V.27, V.29, V.17 and V.34, wherein each transmission mode is designated by a control signal from the bus 26 to be explained later. Also the modem 8 receives a transmission signal from the bus 26 to be explained later and outputs modulated data to a signal line 8a, and receives a reception signal on the signal line 6a and outputs demodulated data to the bus 26 to be explained later.

A calling circuit 10 receives telephone number information by a control signal from the bus 26 to be explained later and outputs a DTMF selection signal to a signal line 10a. The addition circuit 12 receives information signals from the signal lines 8a, 10a and outputs a signal, indicating the result of addition of these information signals, to a signal line 12a.

A reading circuit 14 outputs read data to the bus 26 to be explained later. A recording circuit 16 records, line by line in succession, the information signal supplied to the bus 26 to be explained later. A memory circuit 18 is used as a work memory (REM: random access memory) and as a memory for storing original or encoded information of the read data and storing received or decoded information through the bus 26 to be explained later. In the memory circuit 18, there can be registered, as shown in FIG. 2A, a nickname, a sub-address number and an address for transfer corresponding to a ring type multi-address transmission number, and, as shown in FIG. 2B, a sub-address signal and a communication specification corresponding to a memory box.

The nickname can be, for example, "circulation in primary school" or "circulation in PTA".

An operation unit 20 is provided with a one-touch dial, a contracted number dial, numeral keys, * and # keys, start key, a stop key, a set key, an information registering key for registering information corresponding to a ring type multi-address transmission number, a ring type multi-address transmission start key for selecting the start of ring type multi-address transmission, a password signal input key and other function keys, and outputs key information of each depressed key to the bus 26 to be explained later. The operation unit 20 is also provided with an unrepresented display unit, and receives and information signal supplied on the bus 26 to be explained later and displays such signal on the display unit.

A CPU (central processing unit) 22 executes control of the entire facsimile apparatus and control sequence for the facsimile transmission, according to a program stored in a ROM (read-only memory) 24 storing control program to be explained later. The bus 26 electrically connects various constituent components.

The CPU 22 is provided with first registration means for registering a nickname, a sub-address signal, a transfer address, etc. corresponding to a ring type multi-address transmission number, second registration means for registering a sub-address signal and a communication specification corresponding to a memory box, ring type multi-address transmission start selection means for selecting the start of a ring type multi-address transmission, password signal input means for entering a password signal, discrimination means for discriminating, at the reception of a sub-address signal by facsimile reception, whether the ring type multi-address transmission is designated by the sub-address signal, control means for changing the handling of the above-mentioned password signal according to the result of discrimination by the discrimination means, and password input inhibition means for inhibiting the input of the password signal when the start of the ring type multi-address transmission is selected.

At the reception of a sub-address signal at the facsimile reception, the received password signal is made invalid or valid according as the ring type multi-address transmission is designated or not by such sub-address signal. On the other hand, the input of the password signal is inhibited when the start of a ring type multi-address transmission is selected.

A control program for executing the above-described control is stored in the ROM 24.

The ring type multi-address transmission means multi-address transmission for example from a fax A to a fax B, then the fax B to a fax C, the fax C to a fax D, the fax D to a fax E and finally the fax E to the fax A.

In the following there will be explained the function of the facsimile apparatus of the present embodiment, with reference to flow charts shown in FIGS. 3 to 10.

Figure 3:
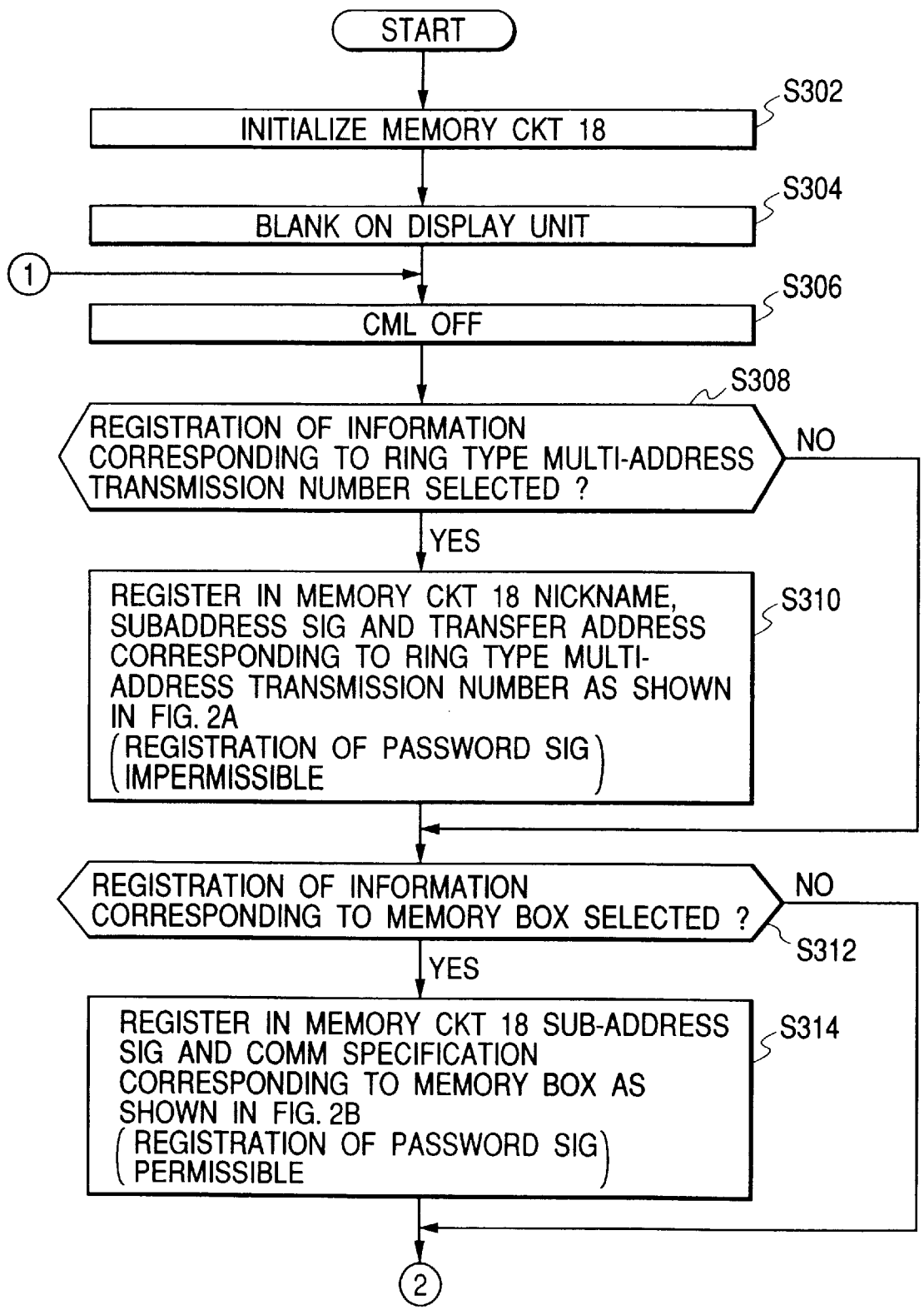

Referring to FIG. 3 a step S302 initializes the memory circuit 18 through the bus 26. Then a step S304 displays no message on the display unit of the operation unit 20 through the bus 26. A next step S306 turns off the CML of the NCU 2 through the bus 26. A next step S308 enters the information of the operation unit 20 through the bus 26 and discriminates whether there is selected the registration of information corresponding to the ring type multi-address transmission.

If the step S308 identifies that the registration of information corresponding to the ring type multi-address transmission is selected, the sequence proceeds to a step S310 to register the nickname, the sub-address signal and the transfer address in the memory circuit 18 through the bus 26, as shown in FIG. 2A, corresponding to the ring type multi-address transmission number, and the sequence then proceeds to a step S312 (registration of the password signal is not permitted in this case).

If the step S308 identifies that the registration of information corresponding to the ring type multi-address transmission is not selected, the sequence proceeds to the step S312, skipping the step S310.

The step S312 enters the information of the operation unit 20 through the bus 26 and discriminates whether there is selected the registration of information corresponding to the memory box.

Figure 4:
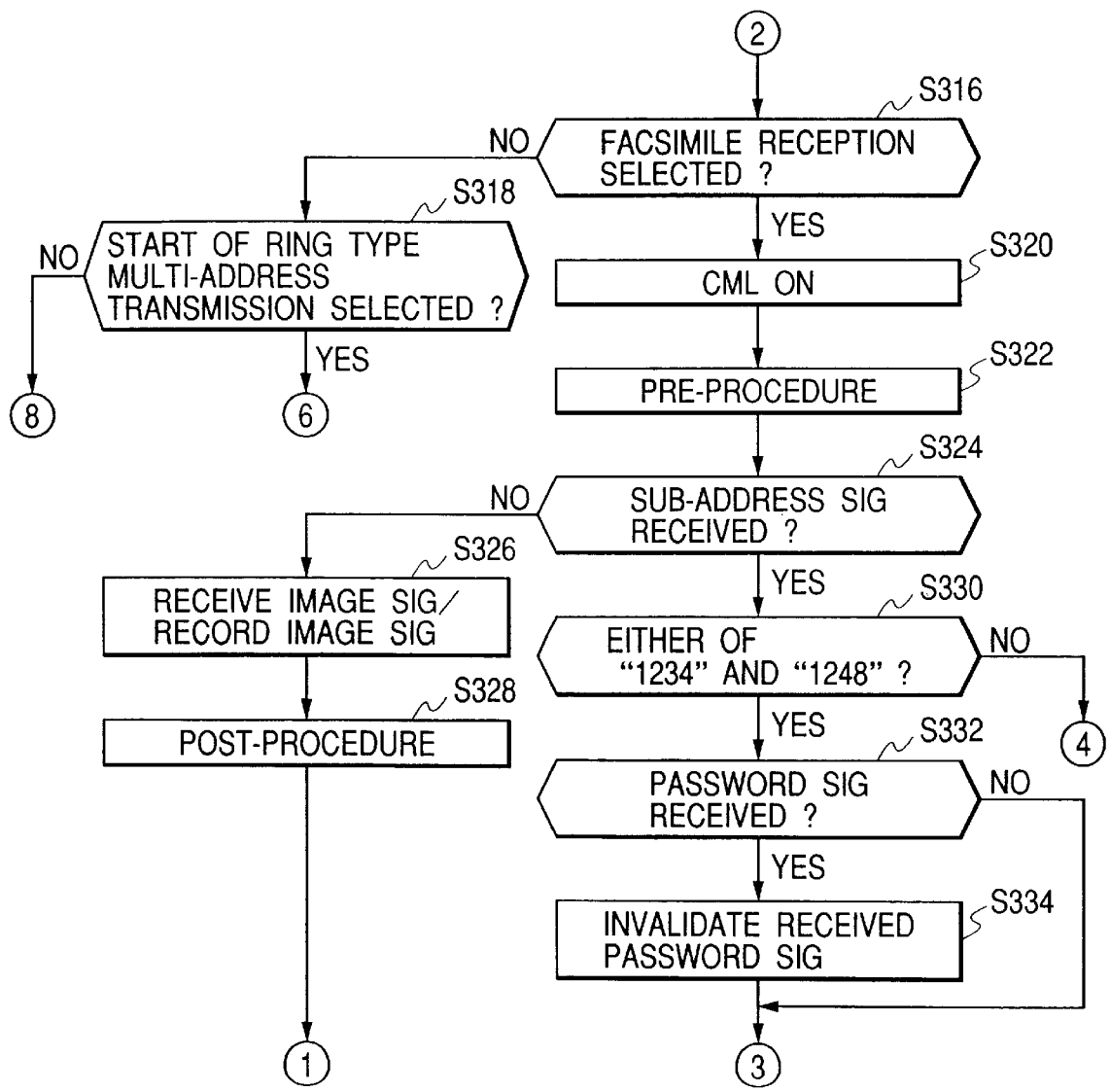

If the step S312 identifies that the registration of information corresponding to the memory box is selected, the sequence proceeds to a step S314 to register the sub-address signal and communication specification in the memory circuit 18 through the bus 26, as shown in FIG. 2B, corresponding to the memory box (registration of the password signal is possible in this case), and the sequence then proceeds to a step S316 in FIG. 4.

If the step S312 identifies that the registration of information corresponding to the memory box is not selected, the sequence proceeds to the step S316 in FIG. 4, skipping the step S314.

Referring to FIG. 4, a step S316 discriminates whether the facsimile reception is selected.

If the step S316 identifies that the facsimile reception is not selected, the sequence proceeds to a step S318 to discriminate whether the start of the ring type multi-address transmission is selected.

Figure 8:
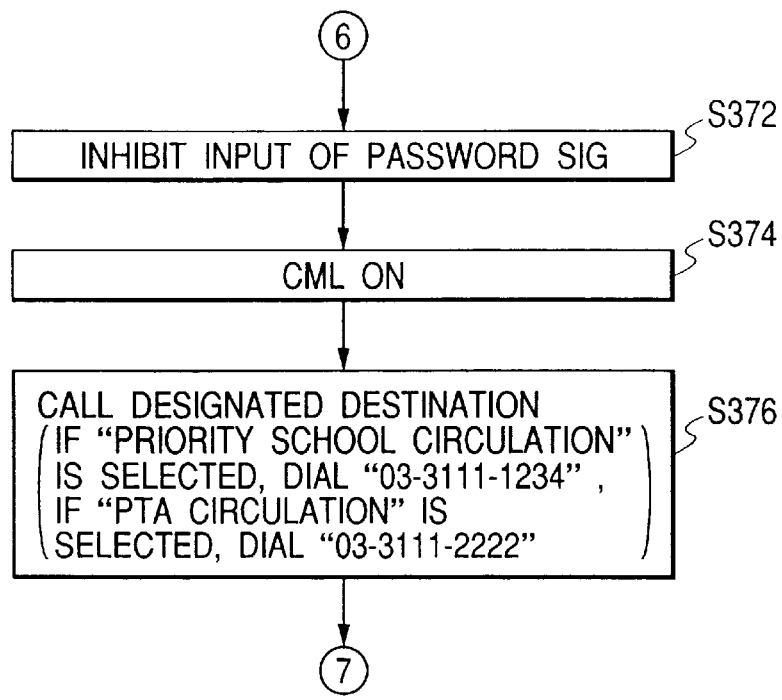

If the step S318 identifies that the selection of the ring type multi-address transmission is selected, the sequence proceeds to a step S372 in FIG. 8, but if the step S318 identifies that the selection of the ring type multi-address transmission is not selected, the sequence proceeds to a step S384 in FIG. 10.

On the other hand, if the aforementioned step S316 identifies that the facsimile reception is selected, the sequence proceeds to a step S320 for turning on the CML of the NCU 2. Then a step S322 executes a pre procedure. In this state there is informed "presence of receiving function for sub-address signal and of receiving function for password signal".

Then a step S324 discriminates whether the sub-address signal is received.

If the aforementioned step S324 identifies that the sub-address signal is not received, the sequence proceeds to a step S326 for executing reception/recording of the image signal. Then a step S328 executes a post procedure, and the sequence returns to the step S306 in FIG. 3.

If the step S324 identifies that the sub-address signal is received, the sequence proceeds to a step S330 for discriminating whether the received sub-address signal is "1234" or "1248".

Figure 6:
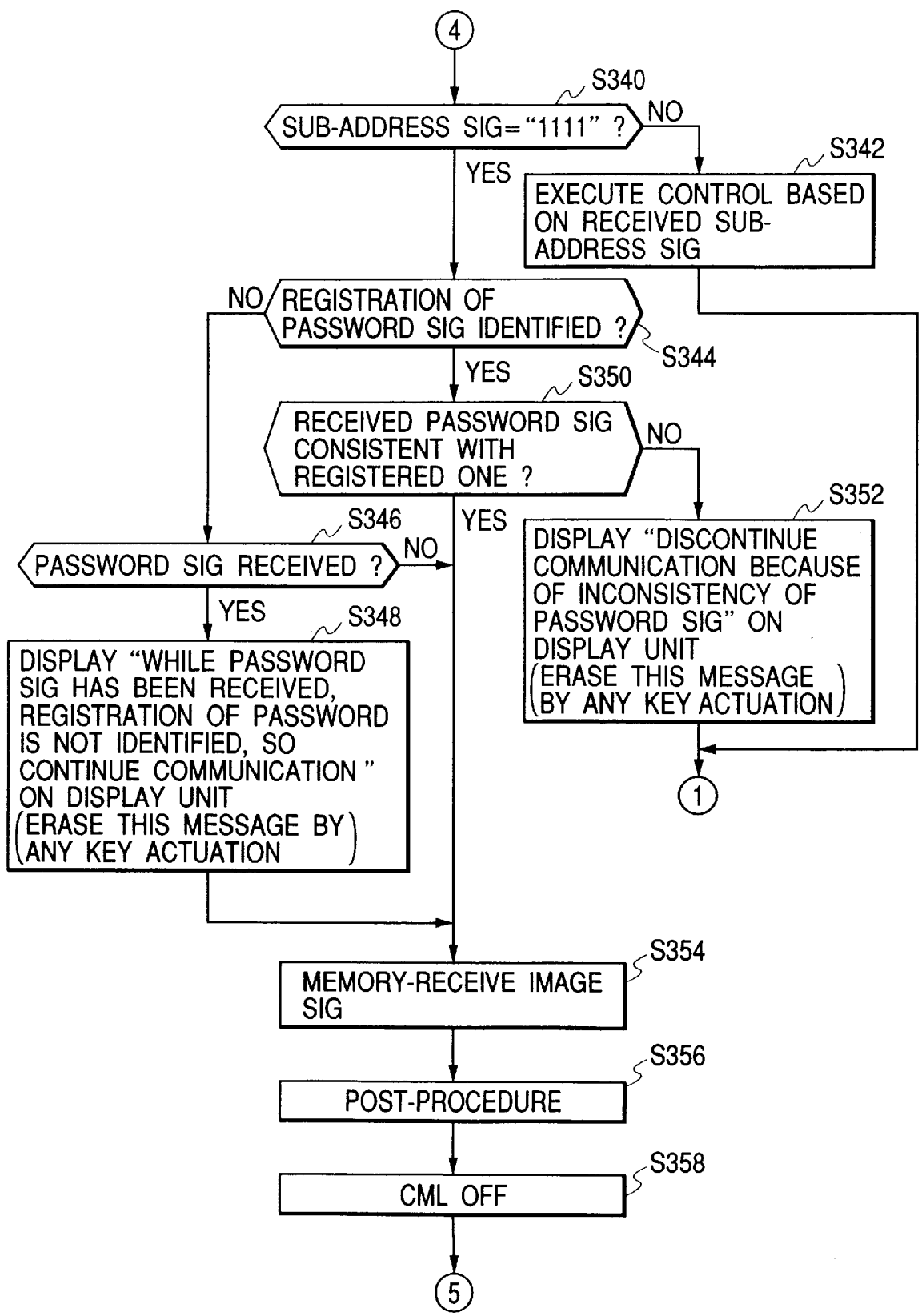

If a step S330 identifies that the received sub-address signal is neither "1234" nor "1248", the sequence proceeds to a step S340 in FIG. 6.

On the other hand, if the step S330 identifies that the received sub-address signal is "1234" or "1248", the sequence proceeds to a step S332 for discriminating whether a password signal is received.

Figure 5:
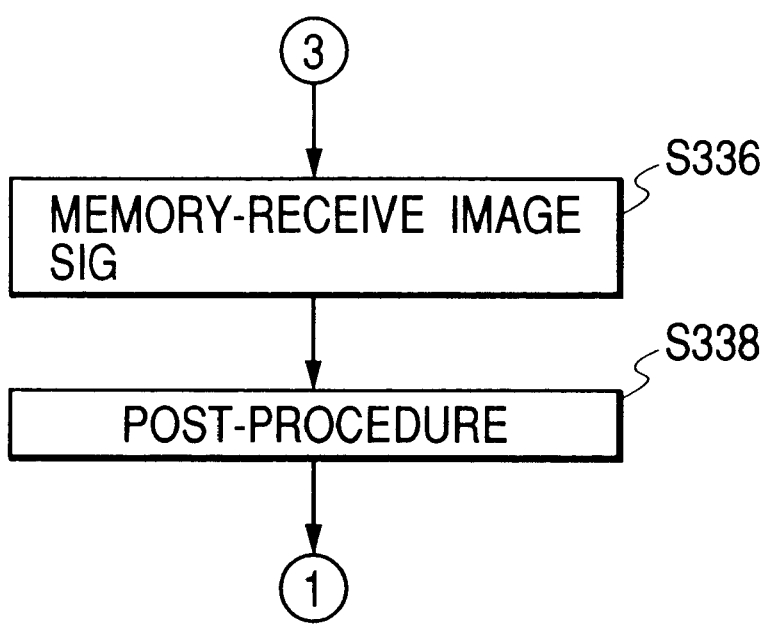

If the aforementioned step S332 identifies that the password signal is received, the sequence proceeds to a step S334 for invalidating the received password signal, and the sequence proceeds to a step S336 in FIG. 5.

On the other hand, if the aforementioned step S332 identifies that the password signal is not received, the sequence directly proceeds to the step S336 in FIG. 5.

Referring to FIG. 5, the step S336 executes memory reception of the image signal, then a next step S338 executes a post procedure and the sequence returns to the step S306 in FIG. 3.

Referring to FIG. 6, the step S340 discriminates whether the received sub-address signal is "1111".

If the aforementioned step S340 identifies that the received sub-address signal is not "1111", the sequence proceeds to a step S342 for executing control based on the received sub-address signal, and the sequence returns to the step S306 in FIG. 3.

If the step S340 identifies that the received sub-address signal is "1111", the sequence proceeds to a step S344 for discriminating whether a password signal is registered in the communication specification of a memory box corresponding to the sub-address signal "1111".

If the aforementioned step S344 identifies that the password signal is registered, the sequence proceeds to a step S350 for discriminating whether the password signal is received and coincides with the registered password.

If the aforementioned step S350 identifies that the password signal is received and coincides with the registered password, the sequence proceeds to a step S354. This step S354 executes memory reception of the image signal, and a next step S356 executes a post procedure. Then a step S358 turns off the CCML of the NCU 2 through the bus 26, and the sequence proceeds to a step S360 in FIG. 7.

On the other hand, if the aforementioned step S344 identifies that the password signal is not registered, the sequence proceeds to a step S346 for discriminating whether the password signal is received.

Then, if the step S346 identifies that the password signal is not received, the sequence proceeds to the aforementioned step S354, but, if the step S346 identifies that the password signal is received, the sequence proceeds to a step S348. This step S348 display a message "Password signal is transmitted, but transmission is continued because the password is not registered" on the display unit of the operation unit 20 through the bus 26, and the sequence proceeds to the aforementioned step S354.

The message displayed by the aforementioned step S348 is erased by any key operation.

On the other hand, if the result of discrimination in the step S350 is negative (NO), the sequence proceeds to a step S352 for displaying a message "Transmission interrupted because the password signal does not coincide" on the display unit of the operation unit 20 through the bus 26, and the sequence returns to the step S306 in FIG. 3.

The message displayed by the aforementioned step S352 is erased by any key operation.

Figure 7:
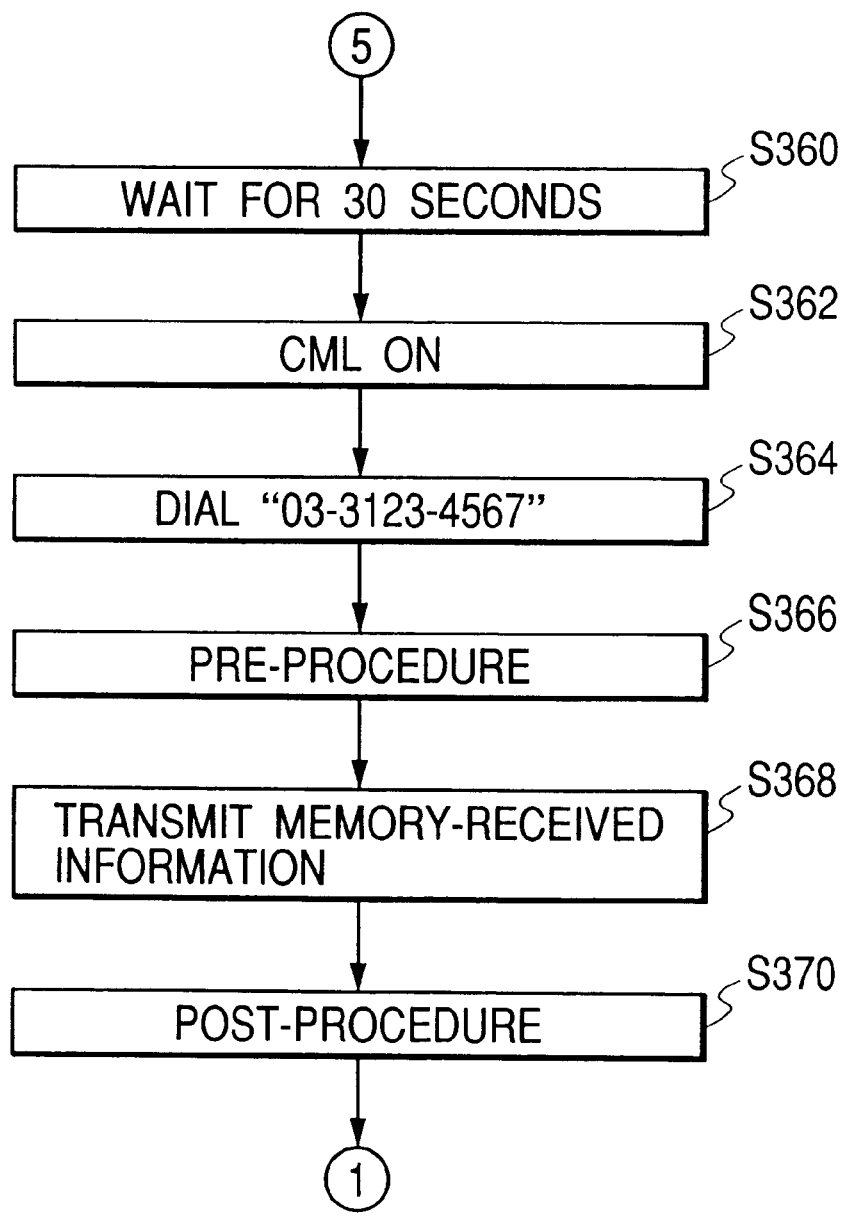

Referring to FIG. 7, the step S340 waits for 30 seconds, and a next step S362 turns on the CML of the NCU 2 through the bus 26. Then a step S364 makes a call to "03-3123-4567" by the calling circuit 10 through the bus 26. Then a step S366 executes a post procedure, a step S368 transmits the information received by memory reception, and a next step S370 executes a post procedure, whereupon the sequence returns to the step S306 in FIG. 3.

Referring to FIG. 8, a step S372 inhibits the input of the password signal from the operation unit 20 through the bus 26. Then a step S374 turns on the CML of the NCU 2 through the bus 26, and a step S376 makes a call to the designated address by the calling circuit 10 through the bus 26. In the present example, the call is made to "03-311-1234" in case of selection of "primary school circulation" or to "03-3111-2222" in case of selection of "PTA circulation". After the aforementioned step S376, the sequence proceeds to a step S378 in FIG. 9.

Figure 9:
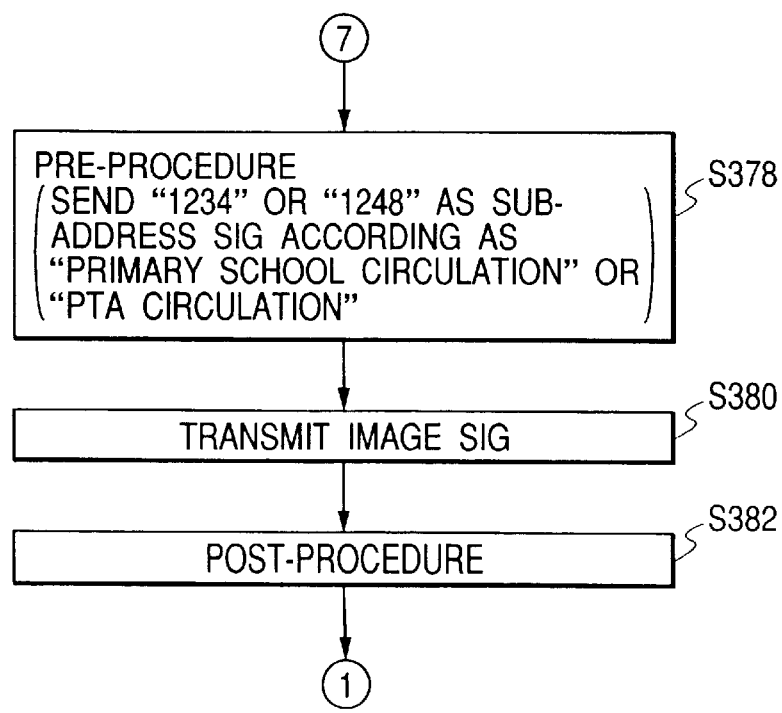

Referring to FIG. 9, a step S378 executes a pre procedure. In the present example, there is transmitted, as the sub-address signal, "1234" in case of "primary school circulation" or "1248" in case of "PTA circulation". A next step S380 executes transmission of the image signal, then a step S382 executes a post procedure are the sequence returns to the step S306 in FIG. 3.

Referring to FIG. 10, a step S384 enters the information of the operation unit 20 through the bus 26 and discriminates whether the transfer of ring type multi-address transmission is selected.

If the aforementioned step S384 identifies that the transfer of the ring type multi-address transmission is not selected, the sequence proceeds to a step S386 to execute another procedure, and the sequence returns to the step S306 in FIG. 3.

On the other hand, if the aforementioned step S384 identifies that the transfer of the ring type multi-address transmission is selected, for example if the PTA circulation is selected, the sequence proceeds to a step S388 for turning on the CML of the NCU 2 through the bus 26. Then the sequence proceeds to a step S390 for making a call to "03-3111-2222" by the calling circuit 10 through the bus 26, and a next step S392 executes a pre procedure. In the present example, "1248" is transmitted as the sub-address signal, but the password signal is not transmitted. After the process of the aforementioned step S392, the sequence proceeds to a step S394 for transmitting, as the PTA circulation, the information received by memory reception, then a next step S396 executes a post procedure and the sequence returns to the step S306 in FIG. 3.

As explained in the foregoing, the facsimile apparatus of the present embodiment provides an advantage of excellent convenience of use, since, in case of execution of the facsimile reception in which a sub-address signal is received and a ring type multi-address transmission is designated, a password signal eventually received at the same time is made invalid, thereby enabling the ring type multi-address transmission to a next address.

The facsimile apparatus of the present embodiment provides an advantage of excellent convenience of use, since the password signal is not transmitted in case the start of the ring type multi-address transmission is selected whereby the ring type multi-address transmission is not inhibited even if the facsimile apparatus constituting the group executing the ring type multi-address transmission checks the password signal.

What is claimed is:

1. A communication apparatus adapted to perform circulation transmission, comprising:

first registration means for registering a nickname, a sub-address signal, and a transfer address corresponding to a circulation transmission number;

second registration means for registering a sub-address signal and a communication specification corresponding to a memory box;

start selection means for selecting a start of a circulation transmission;

password signal input means for entering a password signal;

discrimination means for discriminating, in case of receiving a sub-address signal at data reception, whether a circulation transmission is designated by the sub-address signal; and control means for rendering a password signal invalid based on a result of a discrimination by said discrimination means.

2. A communication apparatus according to claim 1, wherein said control means is adapted, in case of receiving a sub-address signal at a data reception, to render the password signal valid if a circulation transmission is not designated by the password signal.

3. A communication apparatus according to claim 1, further comprising password signal input inhibition means for inhibiting input of the password signal in case a start of a circulation transmission is selected.

4. A communication apparatus according to claim 1, wherein said communication apparatus is a facsimile apparatus.

5. A communication apparatus according to claim 2, wherein said communication apparatus is a facsimile apparatus.

6. A communication apparatus according to claim 3, wherein said communication apparatus is a facsimile apparatus.

* * * * *